US011768940B2

United States Patent
Tahara et al.

(10) Patent No.: US 11,768,940 B2
(45) Date of Patent: Sep. 26, 2023

(54) CONTROLLER SYSTEM

(71) Applicant: OMRON Corporation, Kyoto (JP)

(72) Inventors: Yutaka Tahara, Ritto (JP); Yuta Nagata, Kusatsu (JP)

(73) Assignee: OMRON Corporation, Kyoto (JP)

(*) Notice: Subject to any disclaimer, the term of this patent is extended or adjusted under 35 U.S.C. 154(b) by 124 days.

(21) Appl. No.: 17/438,468

(22) PCT Filed: Mar. 4, 2020

(86) PCT No.: PCT/JP2020/009133
§ 371 (c)(1),
(2) Date: Sep. 13, 2021

(87) PCT Pub. No.: WO2020/195638
PCT Pub. Date: Oct. 1, 2020

(65) Prior Publication Data
US 2022/0147632 A1  May 12, 2022

(30) Foreign Application Priority Data
Mar. 28, 2019  (JP) .................... 2019-062609

(51) Int. Cl.
*G06F 21/57* (2013.01)
*G06F 21/12* (2013.01)

(52) U.S. Cl.
CPC ............. *G06F 21/57* (2013.01); *G06F 21/12* (2013.01); *G06F 2221/033* (2013.01)

(58) Field of Classification Search
CPC ... H04W 12/08; H04W 12/009; H04W 12/67; H04L 41/0893; H04L 63/10;
(Continued)

(56) References Cited

U.S. PATENT DOCUMENTS

2005/0251677 A1* 11/2005 Maeda ................ H04L 63/0428
713/165
2014/0195491 A1* 7/2014 Ma ........................ G06F 9/4451
707/652
(Continued)

FOREIGN PATENT DOCUMENTS

JP          H1145201        2/1999
JP          2000137506      5/2000
(Continued)

OTHER PUBLICATIONS

Tiago Cruz et al., "Integration of PXE-based Desktop Solutions into Broadband Access Networks", 2010 International Conference on Network and Service Management, Oct. 2010, pp. 182-189.
(Continued)

*Primary Examiner* — Farid Homayounmehr
*Assistant Examiner* — Suman Debnath
(74) *Attorney, Agent, or Firm* — JCIPRNET

(57) ABSTRACT

This controller system includes: a program acquisition unit that acquires, by turning on the controller system, a control program from a server in which the control program is stored; a main storage device that stores the control program acquired by the program acquisition unit while electric power is supplied to the controller system; and a program execution unit that executes the control program stored in the main storage device.

3 Claims, 11 Drawing Sheets

(58) Field of Classification Search
CPC ............ H04L 63/1416; H04L 41/0894; H04L 41/0895; H04L 41/40; H04L 41/509; H04L 41/5025; H04L 41/5051; H04L 63/1458; H04N 21/234; H04N 21/2393; H04N 21/2402; H04N 21/26216; H04N 21/26233; H04N 21/631; H04N 21/6131; G06F 21/57; G06F 21/12; G06F 2221/033; G06F 2221/2143; G06F 21/554; G06F 21/575; G06F 21/572; G05B 19/05; G05B 2219/1207; G05B 2219/23304
See application file for complete search history.

(56) References Cited

U.S. PATENT DOCUMENTS

2016/0246585 A1* 8/2016 Li .............................. G06F 8/65
2017/0357515 A1 12/2017 Bower, III et al.

FOREIGN PATENT DOCUMENTS

| | | |
|---|---|---|
| JP | 2001209413 | 8/2001 |
| JP | 2002268707 | 9/2002 |
| JP | 2004005585 | 1/2004 |
| JP | 2005227852 | 8/2005 |
| JP | 2014135043 | 7/2014 |
| JP | 2018128722 | 8/2018 |
| JP | 2018128722 A * | 8/2018 |

OTHER PUBLICATIONS

"Search Report of Europe Counterpart Application", dated Nov. 7, 2022, pp. 1-8.
"International Search Report (Form PCT/ISA/210) of PCT/JP2020/009133", dated Jun. 23, 2020, with English translation thereof, pp. 1-4.
"Written Opinion of the International Searching Authority (Form PCT/ISA/237) of PCT/JP2020/009133", dated Jun. 23, 2020, with English translation thereof, pp. 1-8.
"Office Action of Japan Counterpart Application" with English translation thereof, dated Oct. 18, 2022, p. 1-p. 7.

* cited by examiner

|  | FA | IT |
|---|---|---|
| IN | I/O input from a sensor or like | Keyboard, mouse |
| OUT | I/O output to a servo or like | Screen information |
| High speed | Microsecond Real time property | About 100 ms to 1 second To the extent that a person do not think it is slow |
| Interaction with the server | Control device | Person |
| Object of authentication | Device (serial ID, security chip, etc.) | User Login information |
| Download data | Control program | None |

FIG. 6

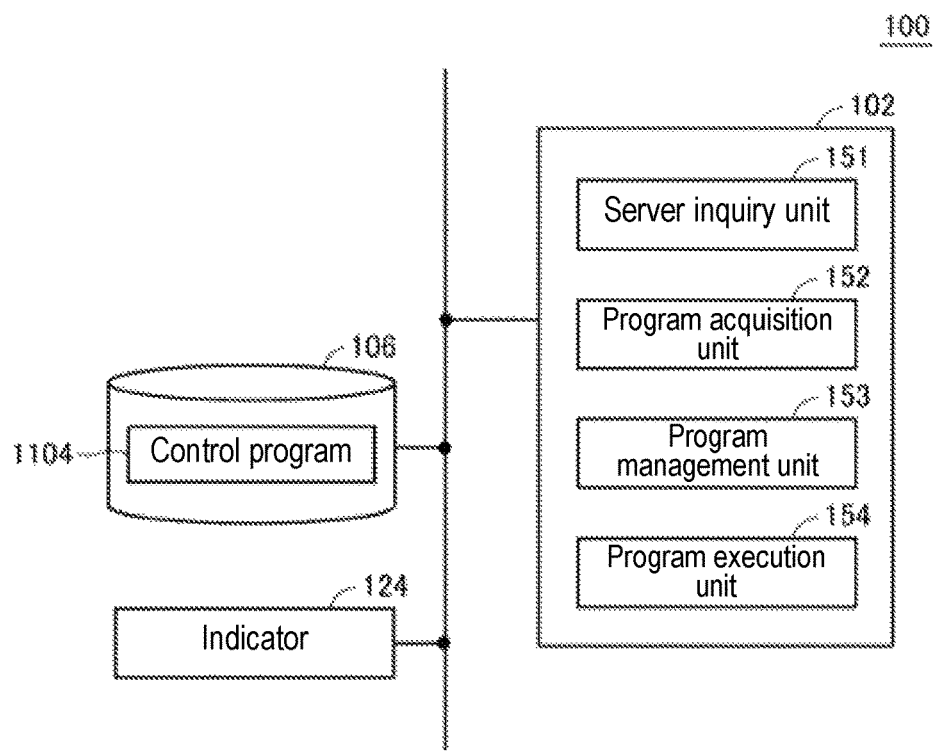

FIG. 7

CONTROLLER SYSTEM

CROSS-REFERENCE TO RELATED APPLICATION

This application is a 371 application of the International PCT application serial no. PCT/JP2020/009133, filed on Mar. 4, 2020, which claims the priority benefits of Japan Patent Application No. 2019-062609, filed on Mar. 28, 2019. The entirety of each of the above-mentioned patent applications is hereby incorporated by reference herein and made a part of this specification.

BACKGROUND

Technical Field

The invention relates to the security of a controller system that executes a control program.

Description of Related Art

Controller systems such as PLC (programmable logic controllers) are used to control various equipment and the various devices arranged in each equipment. The control device can monitor abnormalities that occur in the equipment or machinery to be controlled as well as the abnormalities of the control device itself. When abnormalities are detected, the control device notifies the outside in some way.

For example, Japanese Patent Application Laid-Open No. 2000-137506 (Patent Document 1) has discloses a programmable controller that sends an e-mail to a predetermined destination when an abnormality history is registered or when a predetermined time arrives.

RELATED ART

Patent Literature

[Patent Literature 1] Japanese Patent Application No. 2000-137506

SUMMARY

Problems to be Solved

With recent advancement of ICT (Information and Communication Technology), controller systems are connected to a variety of external devices via networks, and the processing executed in the controller system is becoming more sophisticated. It is assumed the controller system will be exposed to various threats with such networking or intelligentization. Therefore, measures are needed to protect the controller system from possible threats.

Conventional controller systems only detect abnormalities that occur in equipment and machinery or in the controller system itself, and do not anticipate threats as a result of networking or intelligentization.

One object of the invention is to solve the new challenge of protecting against threats that may occur due to networking or intelligentization of controller systems.

Means for Solving the Problems

An example of the present disclosure is a controller system, including: a program acquisition unit that acquires, by turning on the controller system, a control program from a server in which the control program is stored; a volatile storage device that stores the control program acquired by the program acquisition unit while electric power is supplied to the controller system and erases the control program by stopping the supply of the electric power to the controller system; and a program execution unit that executes the control program stored in the volatile storage device.

According to the above, the control program is stored in the controller system only while electric power is supplied to the controller system. When the controller system is not powered, the control program is not stored in the controller system. Therefore, the possibility of information (control program) leaking from the controller system can be reduced. As a result, protection against threats that may occur due to networking or intelligentization of controller systems can be achieved.

Preferably, the controller system further includes a program management unit that manages the validity of the control program by verifying the consistency of information associated with the control program.

According to the above, by confirming that the information associated with the control program is the same (unchanged), the controller system may determine whether the control program acquired from the server is valid.

Preferably, the program acquisition unit receives the control program and a program ID associated with the control program from the server through encrypted communication with the server, and the program management unit verifies the control program and the program ID have not been tampered with and stores the control program in the volatile storage device when verifying a verification ID previously assigned to the control program matches the program ID.

According to the above, the controller system may determine whether or not the control program acquired from the server is correct. Therefore, when the control program is tampered with, the controller system may detect the tampering. Further, by comparing the program ID and the verification ID, the controller system may determine whether or not the control program is correct. The "program ID" means the ID attached to the program. The type of ID is not limited as long as the ID may identify the program. For example, the serial ID of the program may be used as the "program ID".

Preferably, the program management unit generates a holding variable that is a variable for holding a state of the controller system, and uploads the holding variable to the server when the controller system shuts down; and the program acquisition unit acquires the holding variable from the server together with the control program and the program ID.

According to the above, the state of the controller system may be restored after restarting. Further, after shutting down the controller system, it is possible to prevent various information indicating the operating state of the controller system from being leaked from the controller system.

Preferably, the controller system further includes a non-volatile storage device that non-volatilely stores a hash value generated from the previously executed control program, wherein the program management unit generates a hash value of the control program acquired by the program acquisition unit, and stores the control program in the volatile storage device when the hash value generated by the program management unit matches the hash value stored in the non-volatile storage device.

According to the above, the controller system may determine whether or not the control program acquired from the server is the same as the control program executed last time.

Therefore, when the control program is tampered with, the controller system may detect the tampering.

Effects

According to the invention, the new challenge of protecting against threats that may occur due to networking or intelligentization of controller systems can be solved.

BRIEF DESCRIPTION OF THE DRAWINGS

FIG. 6 is a diagram showing some differences between a control system according to the present embodiment and a general thin client system in a table format.

FIG. 7 is a schematic diagram showing a functional configuration example included in a control unit according to the present embodiment.

DESCRIPTION OF THE EMBODIMENTS

Figure 1:
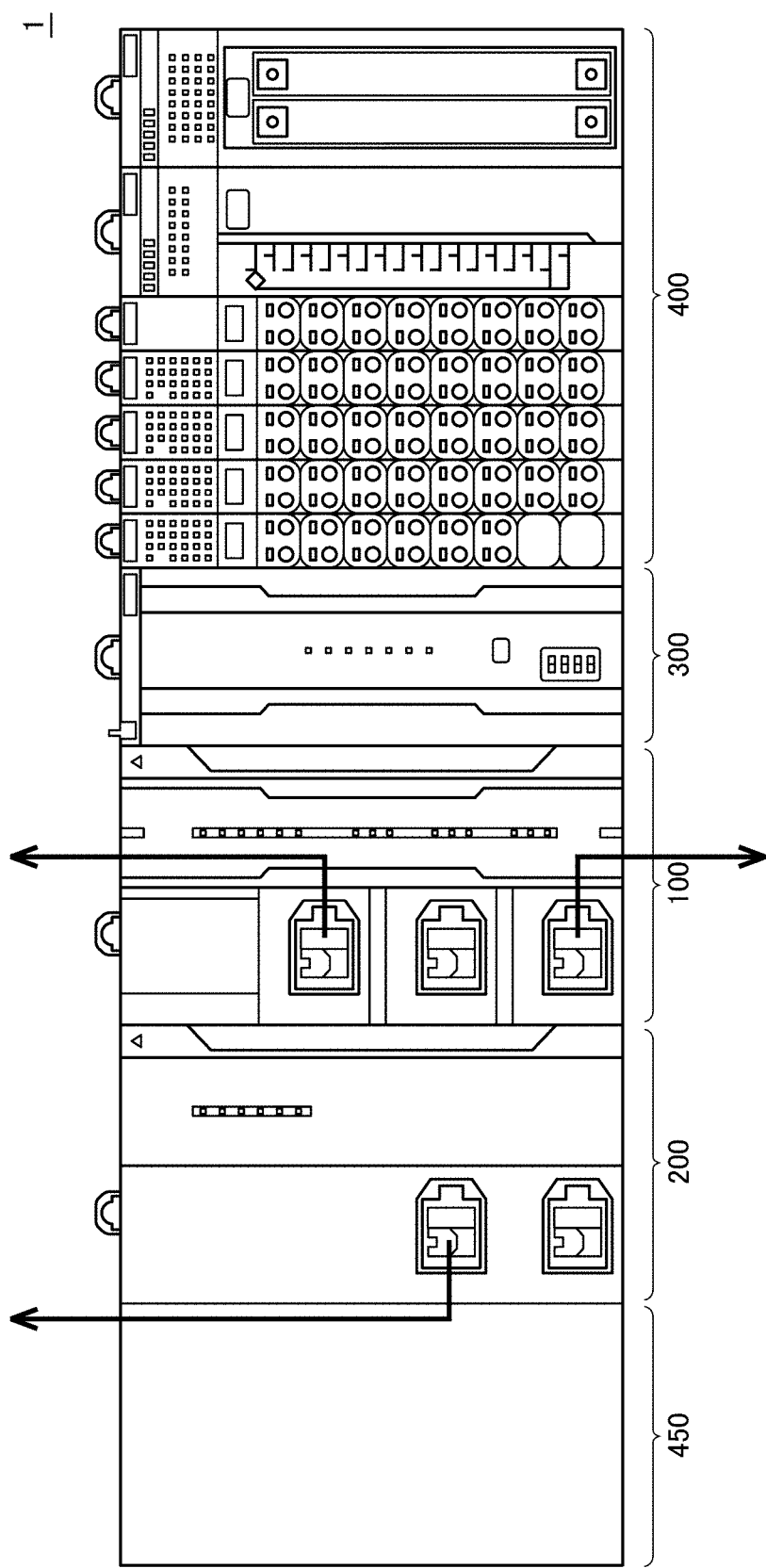
FIG. 1 is an external view showing a configuration example of a controller system according to the present embodiment.

Embodiments of the invention will be described in detail with reference to the drawings. The same or corresponding parts in the drawings are designated by the same reference numerals and the description thereof will not be repeated.

<A. Controller System 1>

First, the configuration of a controller system 1 according to the present embodiment will be described.

FIG. 1 is an external view showing a configuration example of the controller system 1 according to the present embodiment. With reference to FIG. 1, the controller system 1 includes a control unit 100, a security unit 200, a safety unit 300, one or multiple functional units 400, and a power supply unit 450.

The control unit 100 and the security unit 200 are connected via an arbitrary data transmission line (such as PCI Express (registered trademark) or Ethernet (registered trademark) and the like). The control unit 100, the safety unit 300, and the one or multiple functional units 400 are connected via an internal bus (not shown).

The control unit 100 executes a central processing in the controller system 1. The control unit 100 executes a control calculation for controlling a controlled object according to an arbitrarily designed requirement specification. In contrast to the control calculation executed by the safety unit 300, the control calculation executed by the control unit 100 is also referred to as "standard control". In the configuration example shown in FIG. 1, the control unit 100 has one or multiple communication ports. The control unit 100 corresponds to a processing execution unit that executes standard control according to a standard control program.

The security unit 200 is connected to the control unit 100 and is in charge of the security function for the controller system 1. In the configuration example shown in FIG. 1, the security unit 200 has one or multiple communication ports. Details of the security function provided by the security unit 200 will be described later.

The safety unit 300, independently of the control unit 100, executes a control calculation for realizing a safety function related to a controlled object. The control calculation executed by the safety unit 300 is also referred to as "safety control". Usually, the "safety control" is designed to meet the requirements for realizing the safety function specified in an IEC 61508 and the like. "Safety control" is a general term for processes for preventing human safety from being threatened by equipment or machinery.

The functional unit 400 provides a variety of functions for realizing control of various controlled objects by the controller system 1. The functional unit 400 may typically include an I/O unit, a safety I/O unit, a communication unit, a motion controller unit, a temperature adjustment unit, a pulse counter unit, and the like. Examples of the I/O unit include, for example, a digital input (DI) unit, a digital output (DO) unit, an analog input (AI) unit, an analog output (AO) unit, a pulse catch input unit, and composite unit in which multiple types are mixed. The safety I/O unit is in charge of I/O processing related to safety control.

The power supply unit 450 supplies electric power of a predetermined voltage to each unit constituting the controller system 1.

<B. Hardware Configuration Example of Each Unit>

Next, a hardware configuration example of each unit constituting the controller system 1 according to the present embodiment will be described.

(b1: The Control Unit 100)

Figure 2:
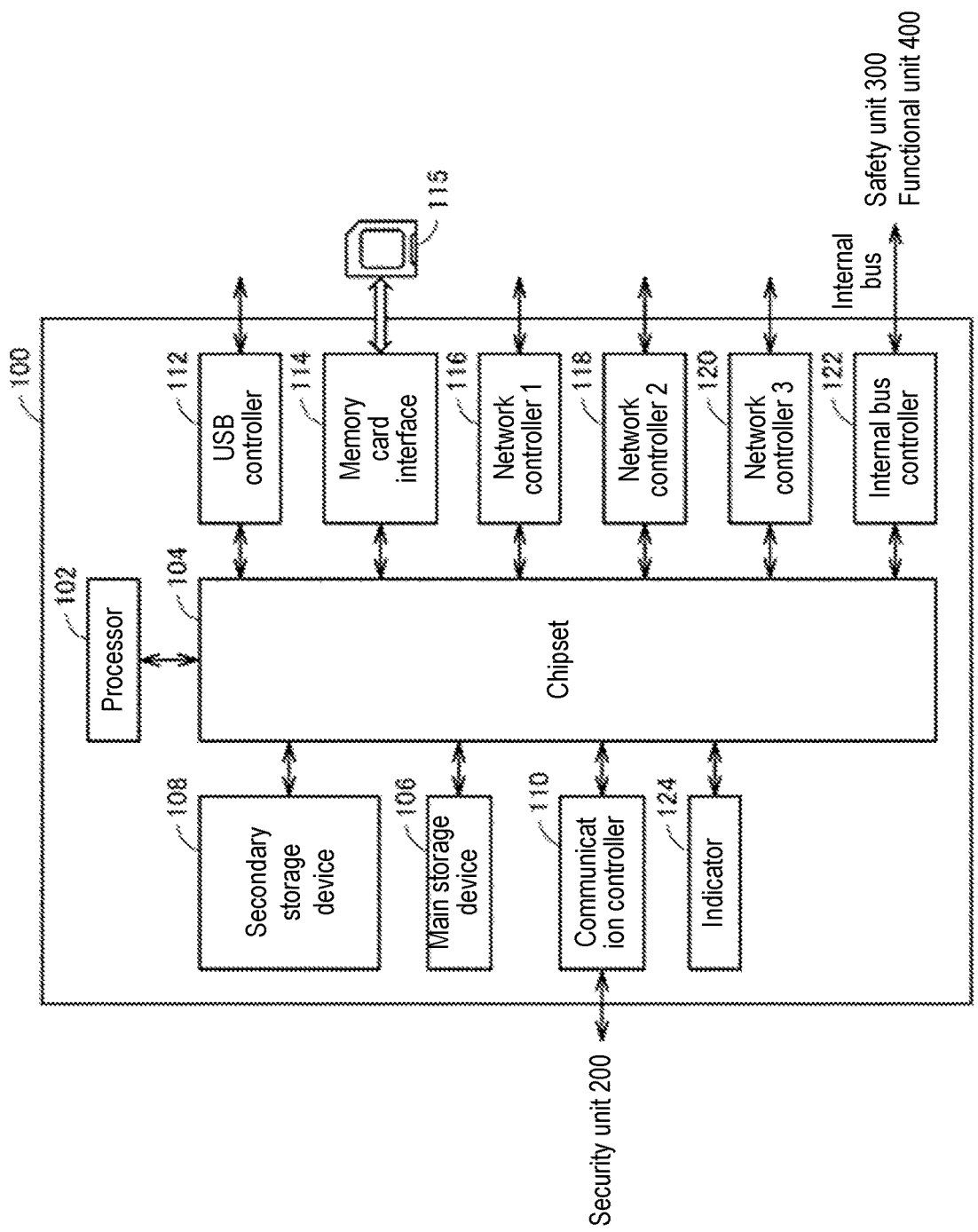
FIG. 2 is a schematic diagram showing a hardware configuration example of a control unit constituting a controller system according to the present embodiment.

FIG. 2 is a schematic diagram showing a hardware configuration example of the control unit 100 constituting the controller system 1 according to the present embodiment. With reference to FIG. 2, the control unit 100 includes, as main components, a processor 102 such as a CPU (Central Processing Unit) and a GPU (Graphical Processing Unit), a chipset 104, a main storage device 106, a secondary storage device 108, a communication controller 110, a USB (Universal Serial Bus) controller 112, a memory card interface 114, network controllers 116, 118, 120, an internal bus controller 122, and an indicator 124.

The processor 102 deploys and executes various programs in the main storage device 106 to realize control calculations related to standard control and various processes as described later. The processor may adopt a configuration having multiple of cores, or multiple processors 102 may be arranged. That is, the control unit 100 has one or multiple processors 102 and/or the processor 102 having one or multiple cores. The chipset 104 realizes the processing of the control unit 100 as a whole by mediating the exchange of data between the processor 102 and each component.

The main storage device 106 is a volatile storage device and holds information while electric power is supplied to the control unit 100.

The secondary storage device 108 is a non-volatile storage device and stores a system program. The secondary storage device 108 may store a key and a certificate for encrypted communication. In the present embodiment, the control program executed by the processor 102 is acquired from the remote (server) and deployed in the main storage device 106 when the control unit 100 is started. The control program is not stored in the secondary storage device 108. Therefore, when the power of the control unit 100 is turned off, the control program is deleted from the main storage device 106. As a result, the control program is not stored in the control unit 100. The control program is stored in the control unit 100 only while electric power is supplied to the control unit 100.

The communication controller 110 is in charge of exchanging data with the security unit 200. As the communication controller 110, for example, a communication chip corresponding to PCI Express, Ethernet, or the like may be adopted.

The USB controller 112 is in charge of exchanging data with an arbitrary information processing device via a USB connection.

The memory card interface 114 is configured such that a memory card 115 may be attached and detached, and data such as a control program and various settings may be written to the memory card 115 or data such as a control program and various settings may be read from the memory card 115.

Each of the network controllers 116, 118, 120 is responsible for exchanging data with any device over the network. The network controllers 116, 118, 120 may adopt industrial network protocols such as EtherCAT (registered trademark), EtherNet/IP (registered trademark), DeviceNet (registered trademark), and CompoNet (registered trademark).

The internal bus controller 122 is in charge of exchanging data with the safety unit 300 and the one or the multiple functional units 400 constituting the controller system 1. For the internal bus, a manufacturer-specific communication protocol may be used, or a communication protocol that is the same as or compliant with any of the industrial network protocols may be used.

The indicator 124 notifies the operating state of the control unit 100 and the like, and is composed of one or multiple LEDs arranged on the surface of the unit. The indicator 124 corresponds to a notification unit that notifies an error such as tampering of a control program.

FIG. 2 shows a configuration example in which the necessary functions are provided by the processor 102 executing the program, but some or all of these provided functions may be implemented using a dedicated hardware circuit (such as ASIC, Application Special Integrated Circuit) or FPGA (Field-Programmable Gate Array) and the like). Alternatively, the main part of the control unit 100 may be realized by using hardware (such as an industrial personal computer based on a general-purpose personal computer) that follows a general-purpose architecture. In this case, virtualization technology may be used to execute multiple OSs (Operating Systems) having different uses in parallel, and to execute necessary applications on each OS.

(b2: The Security Unit 200)

Figure 3:
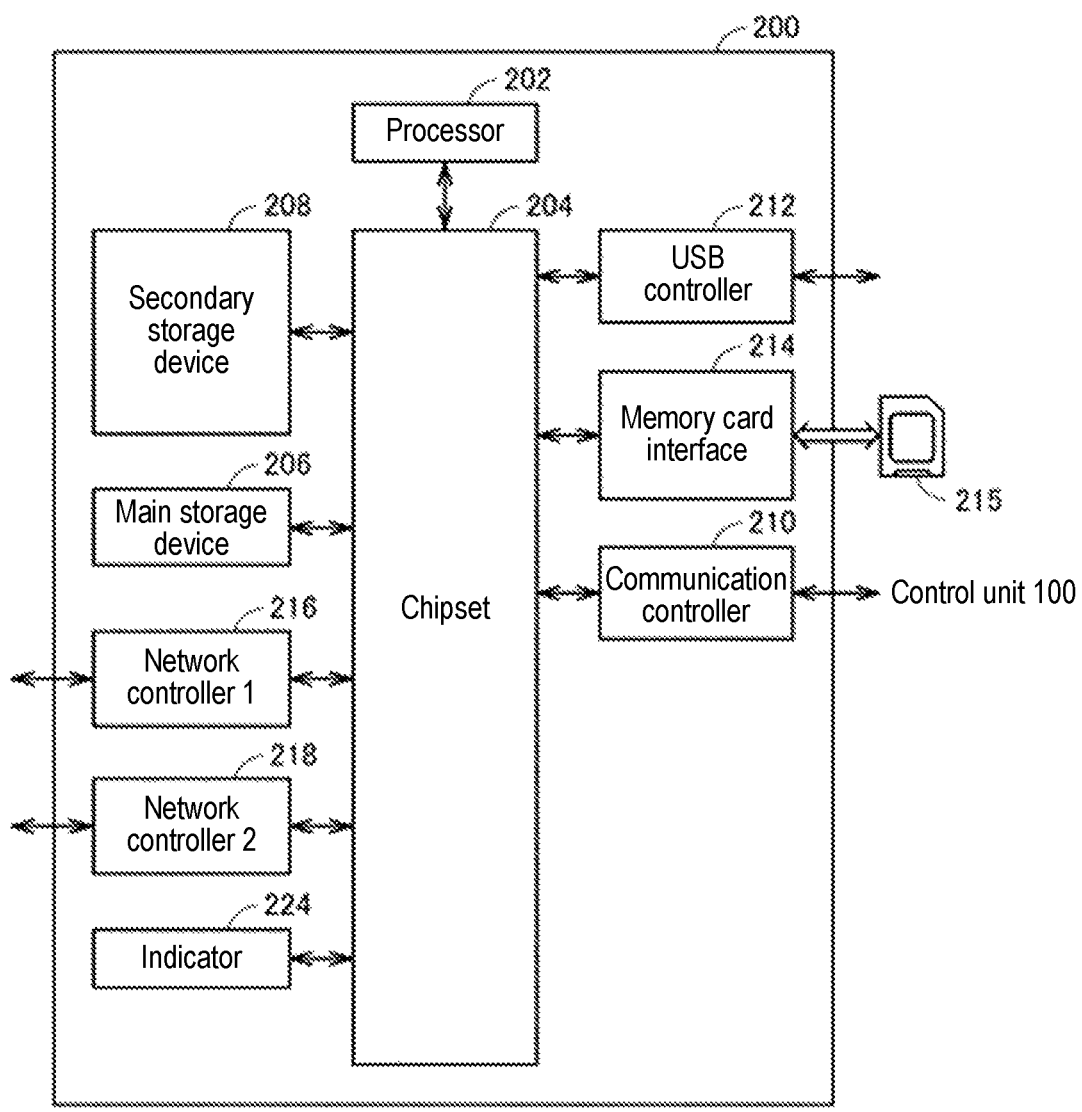
FIG. 3 is a schematic diagram showing a hardware configuration example of a security unit constituting a controller system according to the present embodiment.

FIG. 3 is a schematic diagram showing a hardware configuration example of the security unit 200 constituting the controller system 1 according to the present embodiment. With reference to FIG. 3, the security unit 200 includes, as main components, a processor 202 such as a CPU and a GPU, a chipset 204, a main storage device 206, a secondary storage device 208, a communication controller 210, a USB controller 212, a memory card interface 214, network controllers 216 and 218, and an indicator 224.

The processor 202 reading various programs stored in the secondary storage device 208, deploying and executing them in the main storage device 206 so as to realize various security functions as described later. The chipset 204 realizes the processing of the security unit 200 as a whole by mediating the exchange of data between the processor 202 and each component.

In addition to the system program, the secondary storage device 208 stores a security system program that operates in the execution environment provided by the system program. The secondary storage device 208 may store a key (private key or public key) and a certificate for encrypted communication.

The communication controller 210 is in charge of exchanging data with the control unit 100. As the communication controller 210, similar to the communication controller 110 in the control unit 100, a communication chip corresponding to PCI Express, Ethernet, or the like may be adopted.

The USB controller 212 is in charge of exchanging data with an arbitrary information processing device via a USB connection.

The memory card interface 214 is configured such that the memory card 215 may be attached and detached, and data such as a control program and various settings may be written to the memory card 215 or data such as a control program and various settings may be read from the memory card 215.

Each of the network controllers 216 and 218 is responsible for exchanging data with any device over the network. The network controllers 216 and 218 may adopt a general-purpose network protocol such as Ethernet.

The indicator 224 notifies the operating state of the security unit 200 and the like, and is composed of one or multiple LEDs arranged on the surface of the unit.

FIG. 3 shows a configuration example in which the necessary functions are provided by the processor 202 executing the program, but some or all of these provided functions may be implemented using dedicated hardware circuits (such as ASIC or FPGA). Alternatively, the main part of the security unit 200 may be realized by using hardware (such as an industrial personal computer based on a general-purpose personal computer) that follows a general-purpose architecture. In this case, virtualization technology may be used to execute multiple OSs having different uses in parallel, and to execute necessary applications on each OS.

(b3: The Safety Unit 300)

Figure 4:
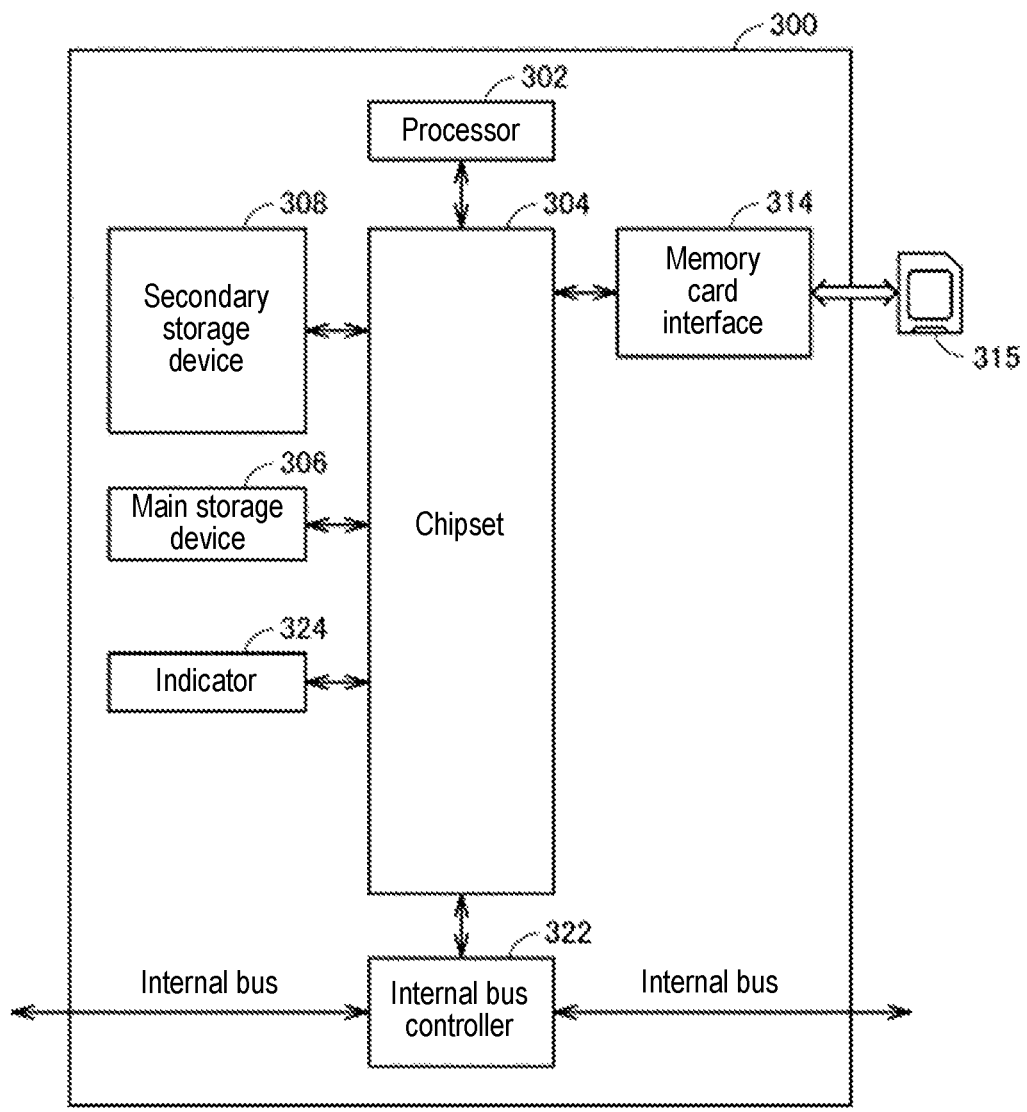
FIG. 4 is a schematic diagram showing a hardware configuration example of a safety unit constituting a controller system according to the present embodiment.

FIG. 4 is a schematic view showing a hardware configuration example of the safety unit 300 constituting the controller system 1 according to the present embodiment. With reference to FIG. 4, the safety unit 300 includes, as main components, a processor 302 such as a CPU and a GPU, a chipset 304, a main storage device 306, a secondary storage device 308, a memory card interface 314, an internal bus controller 322, and an indicator 324.

The processor 302 reads various programs stored in the secondary storage device 308, deploying and executing them in the main storage device 306 so as to realize control calculations related to safety control and various processes as described later. The chipset 304 realizes the processing of the safety unit 300 as a whole by mediating the exchange of data between the processor 302 and each component.

In addition to the system program, the secondary storage device 308 stores a safety program that operates in the execution environment provided by the system program.

The memory card interface 314 is configured such that the memory card 315 may be attached and detached, and data such as a safety program and various settings may be written to the memory card 315 or read data such as a safety program and various settings may be read from the memory card 315.

The internal bus controller 322 is in charge of exchanging data with the control unit 100 via the internal bus.

The indicator 324 notifies the operating state of the safety unit 300 and the like, and is composed of one or multiple LEDs arranged on the surface of the unit.

FIG. 4 shows a configuration example in which the necessary functions are provided by the processor 302 executing the program, but some or all of these provided functions may be implemented using dedicated hardware circuits (such as ASIC or FPGA). Alternatively, the main part of the safety unit 300 may be realized by using hardware (such as an industrial personal computer based on a general-purpose personal computer) that follows a general-purpose architecture. In this case, virtualization technology may be used to execute multiple OSs having different uses in parallel, and to execute necessary applications on each OS.

<C. Control System 10>

Figure 5:
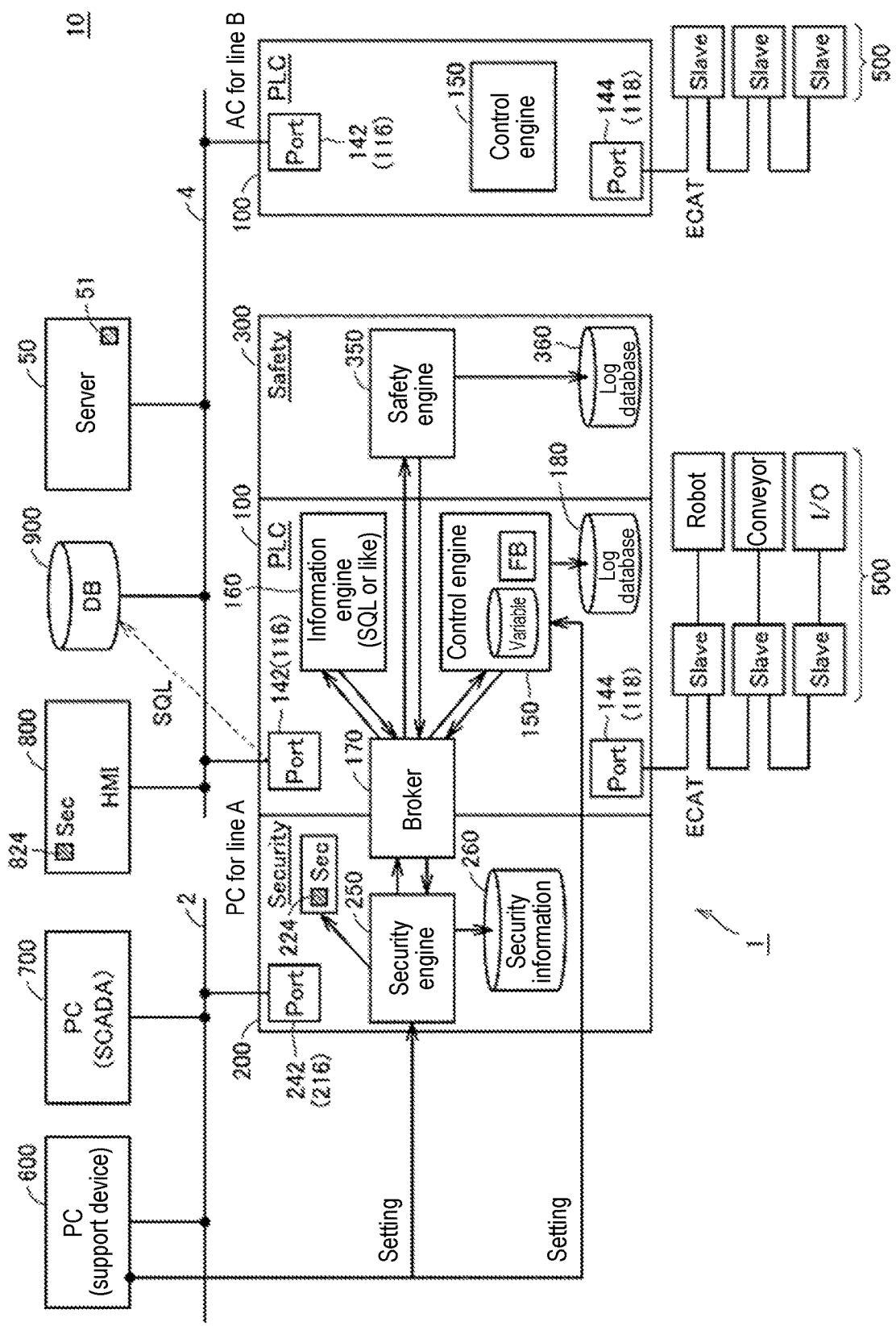
FIG. 5 is a schematic diagram showing a typical example of a control system including a controller system according to the present embodiment.

Next, a typical example of a control system 10 including the controller system 1 according to the present embodiment will be described. FIG. 5 is a schematic diagram showing a typical example of the control system 10 including the controller system 1 according to the present embodiment.

As an example, the control system 10 shown in FIG. 5 controls two lines (line A and line B). Typically, in addition to a conveyor that conveys the work, each line is equipped with a robot that may exert any physical action on the work on the conveyor.

The control unit 100 is arranged on each of the line A and the line B. In addition to the control unit 100 in charge of the line A, the security unit 200 and the safety unit 300 constitute the controller system 1. Furthermore, for convenience of explanation, the functional unit 400 and the power supply unit 450 are omitted in FIG. 5.

The security unit 200 of the controller system 1 is connected to a first network 2 via a communication port 242 (the network controller 216 in FIG. 3). A support device 600 and a SCADA (Supervision Control And Data Acquisition) device 700 are connected to the first network 2. For the first network 2, Ethernet or OPC-UA (Object Linking and Embedding for Process Control Fixed Archive) or the like may be adopted.

The support device 600 at least has access to the control unit 100, and provides the user with functions such as creating a program executed by each unit included in the controller system 1, debugging, and setting various parameters. Tools for a purpose such as development may be installed in the support device 600. The tool is, for example, "Sysmac Studio" manufactured by OMRON Corporation.

The SCADA device 700 presents various information acquired by the control calculation in the controller system 1 to the operator, and generates an internal command or the like for the controller system 1 according to the operation from the operator. The SCADA device 700 also has a function of collecting data handled by the controller system 1.

The control unit 100 of the controller system 1 is connected to a second network 4 via a communication port 142 (the network controller 116 in FIG. 2). A HMI (Human Machinery Interface) 800, database 900, and a server 50 are connected to the second network 4.

The HMI 800 may be realized by a personal computer. The HMI 800 presents various information acquired by the control calculation in the controller system 1 to the operator, and generates an internal command or the like for the controller system 1 according to the operation from the operator. The HMI 800 may store a certificate for encrypted communication with the controller system 1.

The HMI 800 may be configured to be portable by FA maintainers. The database 900 collects various data (such as information on traceability measured from each work) sent from the controller system 1.

The server 50 stores a control program 51 executed by the control unit 100. Further, the server 50 may store various kinds of information for guaranteeing the validity of the control program 51. For example, the server 50 may store information (information for proving that the control program 51 has not been tampered with) for ensuring the validity of the control program 51.

The control unit 100 of the controller system 1 is connected to one or multiple field devices 500 via a communication port 144 (the network controller 118 in FIG. 2). The field device 500 includes a sensor and a detector that collect various information necessary for control calculation from a controlled object, an actuator that exerts some action on the controlled object, and the like. In the example shown in FIG. 5, the field device 500 includes a robot that exerts some external action on the work, a conveyor that conveys the work, an I/O unit that exchanges signals with sensors and actuators arranged in the field, and the like.

Similarly, the control unit 100 in charge of the line B is connected to one or multiple field devices 500 via the communication port 144 (the network controller 118 in FIG. 2).

Focusing on the functional aspect of the controller system 1, the control unit 100 includes a control engine 150, which is a processing execution unit that executes control calculations related to standard control, and an information engine 160 that exchanges data with an external device. The security unit 200 includes a security engine 250 for realizing a security function as described later. The safety unit 300 includes a safety engine 350 which is a processing execution unit that executes a control calculation related to safety control.

Each engine is realized by any hardware element such as a processor of each unit or any software element such as various programs, or a combination of these elements. Each engine may be implemented in any form.

Further, the controller system 1 includes a broker 170 that mediates the exchange between engines. The entity of the broker 170 may be located in one or both of the control unit 100 and the security unit 200.

The control engine 150 holds a variable table, a function block (FB), and the like necessary for executing a control calculation for controlling a controlled object. Each variable stored in the variable table is periodically collected by the value acquired from the field device 500 by the I/O refresh process, and each value is periodically reflected in the field device 500. The log of the control calculation in the control engine 150 may be stored in a log database 180.

The information engine 160 executes arbitrary information processing on the data (variable value held in the variable table) held by the control unit 100. Typically, the information engine 160 includes a process of periodically sending data held by the control unit 100 to the database 900 or the like. SQL or the like is used for sending such data.

The security engine 250 detects an unauthorized intrusion that occurs in the controller system 1, processes according to the detected unauthorized intrusion, determines whether or not an incident has occurred, and executes processing according to the incident that has occurred. The behavior of the security engine 250 is stored as security information 260.

The security engine 250 notifies, with the indicator 224, that some security-related event has occurred, or the level of the security-related event that has occurred.

The safety engine 350 corresponds to a detection means for detecting whether or not some kind of unauthorized intrusion has occurred in the controller system 1. The safety engine 350 acquires and reflects, via the control unit 100, the safety I/O variables necessary for executing the control calculation related to the safety control. The log of the safety control in the safety engine 350 may be stored in a log database 360.

When the security engine 250 detects some event, for example, the broker 170 changes the operation of the control engine 150, the information engine 160, the safety engine 350, and the like.

<D. Differences Between the Present Embodiment and the General Thin Client Method>

In the present embodiment, the control program is stored in the control unit 100 only while electric power is supplied to the control unit 100. The present embodiment is similar to a thin client system in that the program is stored non-volatilely on the server side. However, the thin client is a mechanism that performs the main processing on the server side while minimizing the functions of the client used by the user. On the other hand, in the present embodiment, the control system 10 is operated at the site of FA (Factory Automation). Therefore, the control system 10 and the controller system 1 are required to perform high-speed and high-precision control. The controller system 1 executes the control process for high-speed and high-precision control. In this respect, the present embodiment is different from a general thin client system.

FIG. 6 is a diagram showing some differences between the control system according to the present embodiment and a general thin client system in a table format. The control system according to the present embodiment is referred to as "FA" in FIG. 6. On the other hand, a general thin client system is referred to as "IT" in FIG. 6. In addition to the above-mentioned differences, the following points can be mentioned as the differences between the control system according to the present embodiment and the general thin client system.

(1) Input (IN)

In the present embodiment, the input to the control system is an I/O input from a sensor or the like. On the other hand, in the thin client system, the input is an input from an input device used by the user, such as a keyboard or a mouse.

(2) Output (OUT)

In the present embodiment, the output from the control system is an I/O output to a field device (such as a servo motor, etc.) or the like. On the other hand, in the thin client system, screen information is output from the server to the client.

(3) High Speed

In the present embodiment, high speed processing is required for reasons such as synchronization between the control unit and other units. In one example, the process is performed in microseconds. That is, processing that is executed in substantially real time is required. On the other hand, in the thin client system, the processing speed may be such that the update of the screen on the client side does not seem to be slow for the user. In one example, the processing speed is about 100 ms to 1 second.

(4) Interaction with the Server

In the present embodiment, it is an interaction between a control device (the controller system 1) and a server, whereas in a thin client system, it is an interaction between a person (user) and a server.

(5) Object of Authentication

In the present embodiment, the object of authentication is a device (such as a serial ID or a security chip). On the other hand, in the thin client system, the object of authentication is the user (login information).

(6) Data Download

In the present embodiment, the controller system 1 downloads a control program (specifically, an object code) from the server 50. On the other hand, in a thin client system, the client basically does not download data from the server.

<E. Functional Configuration Example of the Control Unit 100>

FIG. 7 is a schematic diagram showing a functional configuration example included in the control unit 100 according to the present embodiment. With reference to FIG. 7, in the control unit 100, the main storage device 106 stores a control program 1104. The processor 102 periodically executes the control program 1104 under the OS (Operating System). The processor 102 includes a server inquiry unit 151, a program acquisition unit 152, a program management unit 153, and a program execution unit 154.

By turning on the controller system 1, the controller system 1 is started. The server inquiry unit 151 executes an inquiry and authentication to the server 50 so as to download the control program (user program) from the server 50 (see FIG. 5). When the server 50 authenticates the control unit 100, the program acquisition unit 152 acquires (downloads) the control program from the server according to a predetermined procedure.

The program management unit 153 verifies the validity of the downloaded control program. Specifically, the program management unit 153 manages the validity of the control program by verifying the consistency of the information associated with the control program. If the downloaded control program is valid, the control program is stored in the main storage device 106. On the other hand, if the downloaded user program is not valid, the program management unit 153 controls the notification unit including the indicator 124 so as to output a notification. The program execution unit 154 executes the control program 1104 stored in the main storage device 106.

<F. Prevention of Information Leakage>

Figure 8:
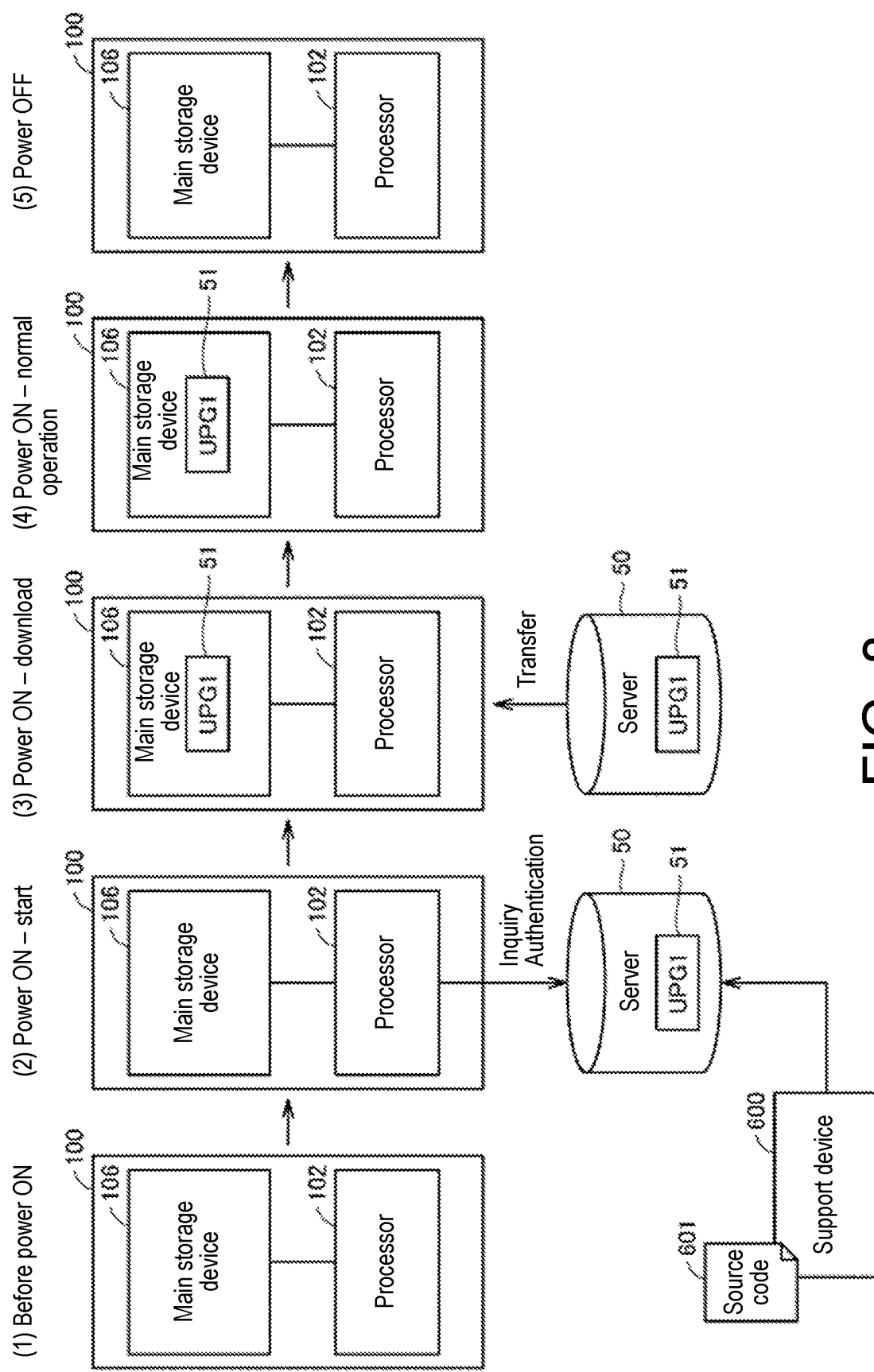
FIG. 8 is a diagram illustrating transfer of a user program to a control unit according to the present embodiment.

FIG. 8 is a diagram illustrating transfer of the user program to the control unit 100 according to the present embodiment. With reference to FIG. 8, no information is stored in the main storage device 106 before the power is turned on (step (1)).

The support device 600 converts a source code 601 created by the user into a program (object code) to generate the control program 51 (denoted as "UPG1" in FIG. 8), and stores the control program 51 in the server 50.

When the power is turned on, the control unit 100 is started. The processor 102 (the server inquiry unit 151 shown in FIG. 7) executes an inquiry and authentication process to the server 50 (step (2)).

The server 50 authenticates the control unit 100. The processor 102 (the program acquisition unit 152 shown in FIG. 7) downloads the control program 51 from the server 50. The control program 51 is stored in the main storage device 106 (step (3)).

When the control program 51 is stored in the main storage device 106, the processor 102 (the program execution unit 154 shown in FIG. 7) calls and executes the control program including the control program 51 (step (4)). As a result, the control unit 100 operates normally.

When the power of the control unit 100 is turned off, the information stored in the main storage device 106 is erased (step (5)).

As described above, by turning off the power of the control unit 100, the control program 51 is erased from the main storage device 106. This makes it possible to prevent information leakage from the control unit 100. In addition, the control program is written in binary code. Even if the control program is read from the control unit 100 when the power of the control unit 100 is turned on, it is difficult to analyze the control program. In this respect as well, in the present embodiment, information leakage can be prevented.

<G. Use of Encrypted Communication>

From the viewpoint of security, it is necessary to consider the following two points regarding the download of the control program from the server 50.

The first point is that the server 50 may be spoofed. It is necessary to consider the possibility that the control unit 100 downloads an unauthorized control program from a fake server.

The second point is that an unauthorized client may access the server 50. It is necessary to consider the possibility that the control program is stolen from the server 50.

In the present embodiment, encrypted communication is used for communication between the server 50 and the control unit 100. According to one embodiment, SSL (Secure Sockets Layer) is used as a protocol for communication between the server 50 and the control unit 100.

Figure 9:
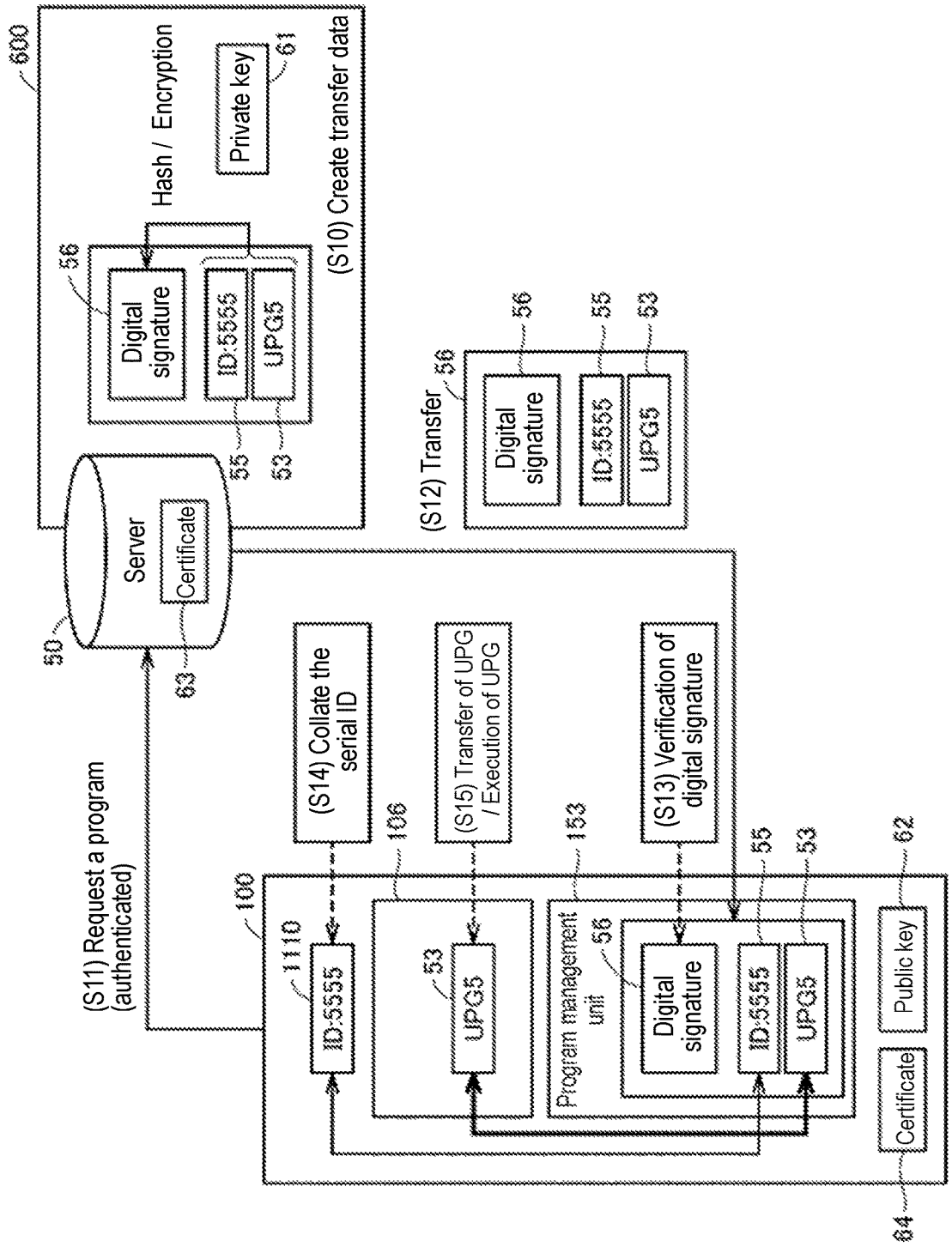
FIG. 9 is a schematic diagram illustrating a flow of transfer and execution of a control program by secure communication between a control unit and a server.

FIG. 9 is a schematic diagram illustrating a flow of transfer and execution of a control program by secure communication between the control unit 100 and the server 50. With reference to FIG. 9, the server 50 stores a certificate 63 (SSL certificate), and the control unit 100 stores a certificate 64 (SSL certificate). This proves that each of the server 50 and the control unit 100 is authentic.

In the present embodiment, the control program is transferred from the server 50 to the control unit 100 by using the public key cryptosystem. As a result, the control unit 100 may receive the correct control program.

Moreover, in the present embodiment, not only the control program but also the serial ID is transferred from the server 50. The serial ID is information associated with the control program, and is an ID (program ID) associated with the control program stored in the server 50. On the other hand, the control unit 100 also stores the serial ID non-volatilely. The serial ID stored in the control unit 100 is a program ID assigned in advance to the control program.

The control unit 100 uses the serial ID as a verification ID. Specifically, the control unit 100 compares the serial ID transferred together with the control program 51 from the server 50 with the verification ID stored in the control unit 100. That is, the control unit 100 verifies the consistency of the information (serial ID) associated with the control program. When the two serial IDs match, the control unit 100 stores the control program in the main storage device 106 and executes it. Therefore, the possibility that the control unit 100 executes an unauthorized program is reduced.

The procedure for executing the above-mentioned processing will be described below. First, in step S10, the support device 600 creates the transfer data. Specifically, the support device 600 uses a hash function to generate a control program 53 (denoted as "UPGS" in FIG. 9) and a hash value a serial ID 55 ("5555" in the example of FIG. 9). Further, the support device 600 uses a private key 61 to encrypt the hash value so as to create a digital signature 56. The support device 600 stores a set of the control program 53, the serial ID 55, and the digital signature 56 in the server 50.

The control unit 100 has been authenticated by the server 50. The control unit 100 accesses the server 50 and requests a control program (step S11). In response to the request from the control unit 100, the server 50 transfers the set of the control program 53, the serial ID 55, and the digital signature 56 to the control unit 100 (step S12). In the control unit 100, the program acquisition unit 152 (see FIG. 7) acquires a set of the control program 53, the serial ID 55, and the digital signature 56.

The control unit 100 (the program management unit 153) verifies the digital signature 56 (step S13). Specifically, the program management unit 153 uses a public key 62 to decrypts the digital signature 56 so as to acquire a hash value. Further, the program management unit 153 uses a hash function to generate a hash value from the control program 53 and the serial ID 55. The program management unit 153 compares the hash value generated from the control program 53 with the hash value decrypted from the digital signature 56.

When both hash values match, it is verified that the control program 53 has not been tampered with. In this case, the program management unit 153 collates the serial ID 55 transferred from the server 50 with a serial ID 1110 stored in advance in the control unit 100 (step S14). The serial ID 1110 is non-volatilely stored in the secondary storage device 108 (see FIG. 2).

When the serial ID 55 and the serial ID 1110 match, the program management unit 153 transfers the control program 53 to the main storage device 106. The program execution unit 154 (see FIG. 7) executes the control program 53 stored in the main storage device 106. On the other hand, if the serial ID 55 and the serial ID 1110 do not match, the program management unit 153 erases the control program 53.

When the control unit 100 is started, in addition to the digital signature 56, the control program 53, and the serial ID 55, other information may also be transferred from the server 50 to the control unit 100.

Figure 10:
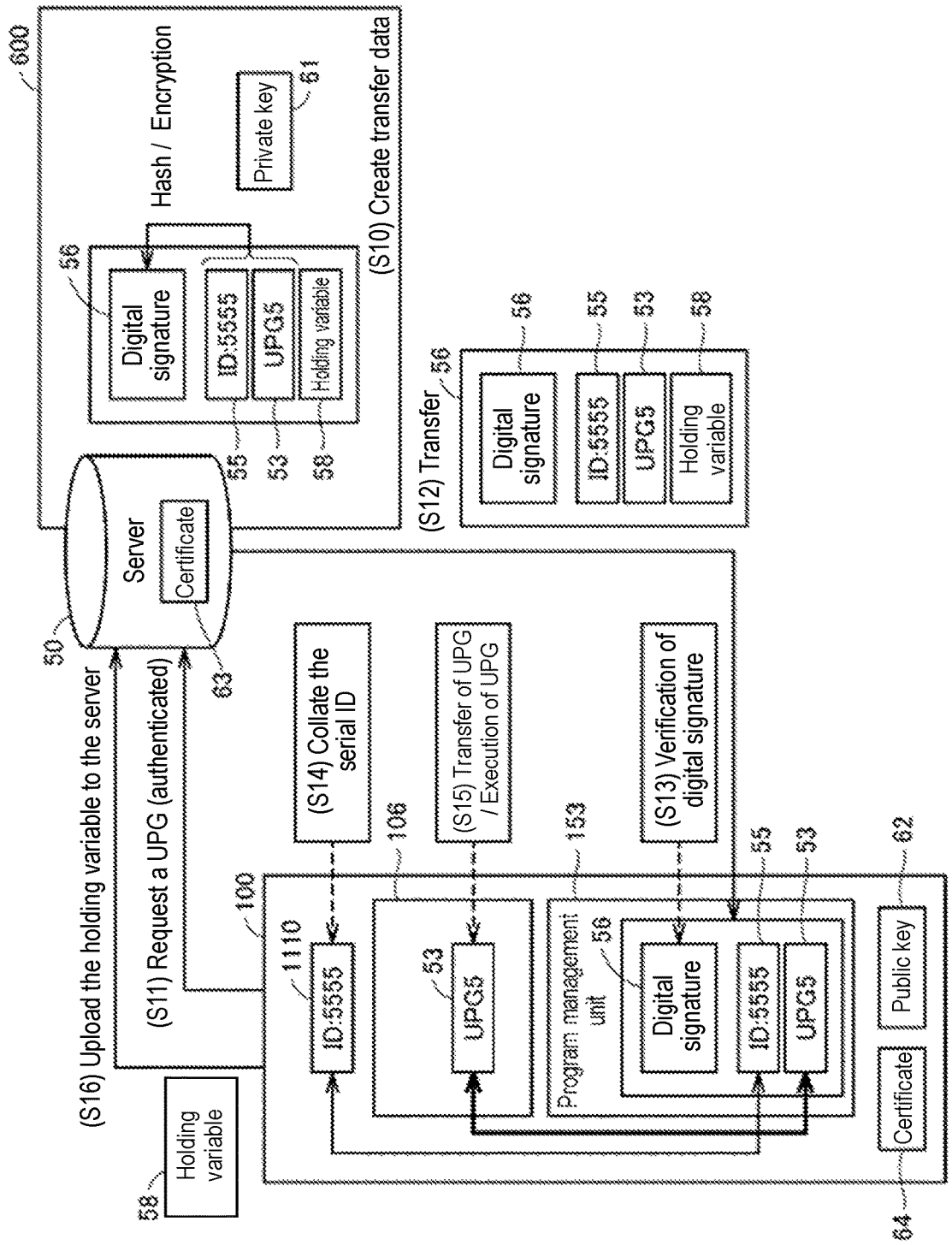
FIG. 10 is a schematic diagram illustrating an example of information transferred together with a control program and a serial ID from a server.

FIG. 10 is a schematic diagram illustrating an example of information transferred together with the control program 53 and the serial ID 55 from the server 50. With reference to FIG. 10, the control unit 100 uploads a holding variable 58 to the server 50 during the shutdown process (step S16). The holding variable 58 is a variable for holding the state before the shutdown of the control unit 100 even after the restart of the control unit 100.

The processes of steps S10 to S15 are basically the same as the processes shown in FIG. 9. In step S10, the support device 600 generates a hash value from, in addition to the control program 53 and the serial ID 55, the holding variable 58. The support device 600 uses the private key 61 to encrypt the hash value so as to generate the digital signature 56.

The control unit 100 accesses the server 50 and requests a control program (step S11). In response to the request from the control unit 100, the server 50 transfers the set of the control program 53, the serial ID 55, the holding variable 58, and the digital signature 56 to the control unit 100 (step S12).

The program management unit 153 uses the public key 62 to decrypt the digital signature 56 so as to acquire a hash value. Further, the program management unit 153 uses a hash function to generate a hash value from the control program 53, the serial ID 55, and the holding variable 58. The program management unit 153 compares the hash value with the hash value decrypted from the digital signature 56 so as to verify the digital signature (step S13). If both hash values match, the program management unit 153 collates the serial ID 55 transferred from the server 50 with the serial ID 1110 stored in advance in the control unit 100 (step S14). When the serial ID 55 and the serial ID 1110 match, the program management unit 153 transfers the control program 53 to the main storage device 106. The program execution unit 154 (see FIG. 7) executes the control program 53 stored in the main storage device 106.

The holding variable 58 may be stored in the main storage device 106. After uploading the holding variable 58 to the server 50, the control unit 100 is shut down. By shutting down the control unit 100, the holding variable 58 may be erased from the control unit 100.

<H. Control Program Update/Redistribution>

It may be desirable to update the control program during the operation of the control unit 100. For example, the control program is updated to add or update features. Alternatively, it may be necessary to redistribute the control program from the server 50 to the control unit 100. For example, when the control unit 100 is restarted due to the occurrence of an incident, it may be necessary to redistribute the control program from the server 50 to the control unit 100.

Figure 11:
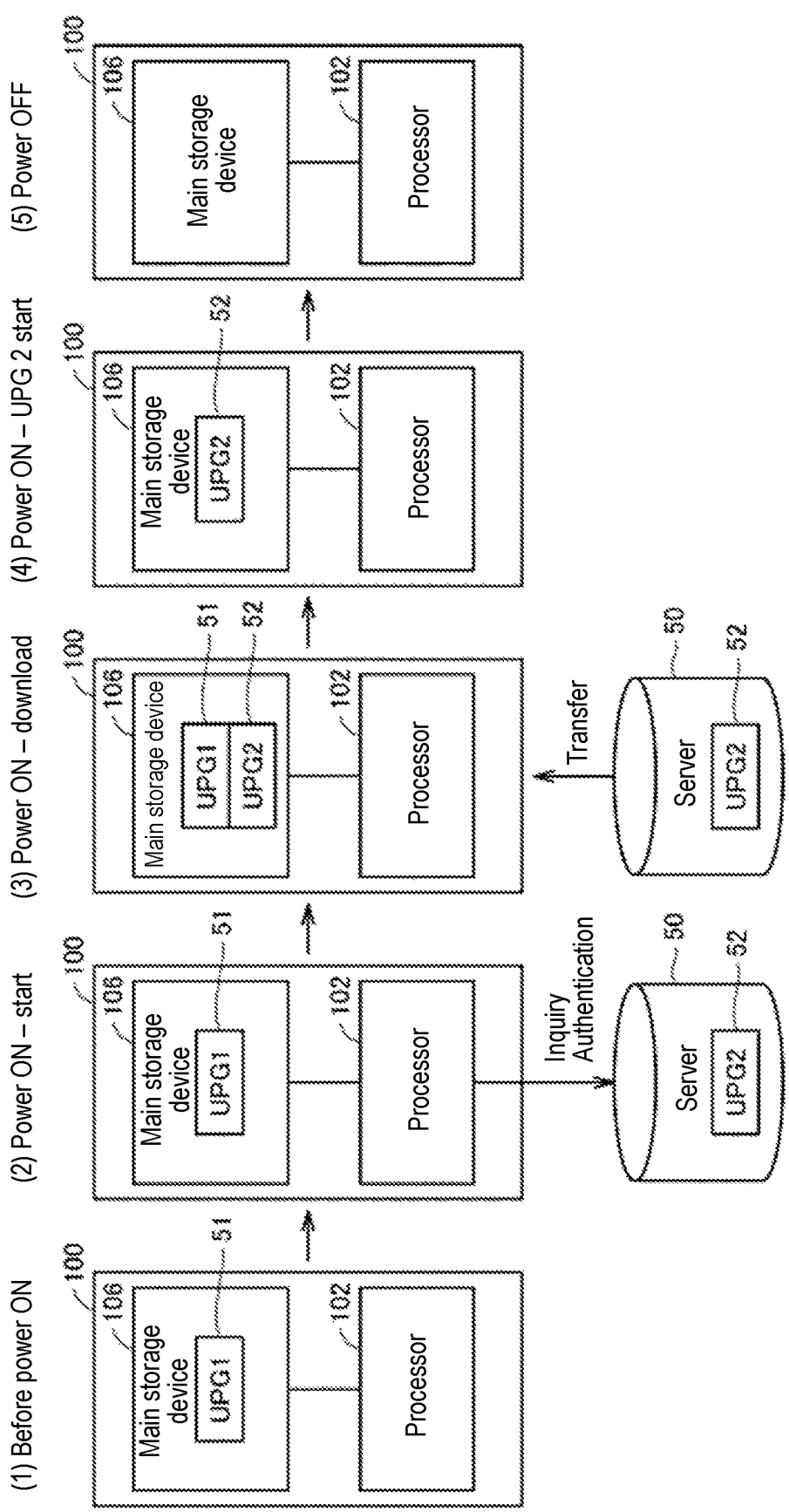
FIG. 11 is a diagram illustrating transfer of a control program for update or redistribution of the control program.

FIG. 11 is a diagram illustrating the transfer of the control program for update or redistribution of the control program. With reference to FIG. 11, the control unit 100 operates according to the control program 51 (denoted as "UPG1" in FIG. 11) in a power-on state (step (1)).

The control program is updated, and a new control program 52 (denoted as "UPG2" in FIG. 11) is stored in the server 50. In this case, the server 50 may send a notification of program update to the control unit 100. The control unit 100 executes an inquiry and an authentication process to the server 50 so as to download the control program 52 from the server 50 (step (2)).

The control program 52 is downloaded from the server 50 to the control unit 100. The control unit 100 executes the process shown in FIG. 9 or 10 and stores the control program 52 in the main storage device 106 (step (3)). The control program 51 is replaced by the new control program 52.

The processor 102 reads the control program 52 from the main storage device 106 and executes it. As a result, the control unit 100 operates normally (step (4)). Also in this case, since the control program is stored only in the main storage device 106, the control program is deleted from the main storage device 106 when the power of the control unit 100 is turned off (step (5)). Therefore, the possibility that the control program is leaked can be reduced.

<I. Detection of Tampering with Control Program>

As shown in FIG. 9 and FIG. 10, in the present embodiment, tampering of the control program may be detected by using the electronic signature and the key. As a result, information leakage may be detected. However, the method is not limited to the above method, and other methods for detecting tampering of the control program may be applied to the present embodiment.

Figure 12:
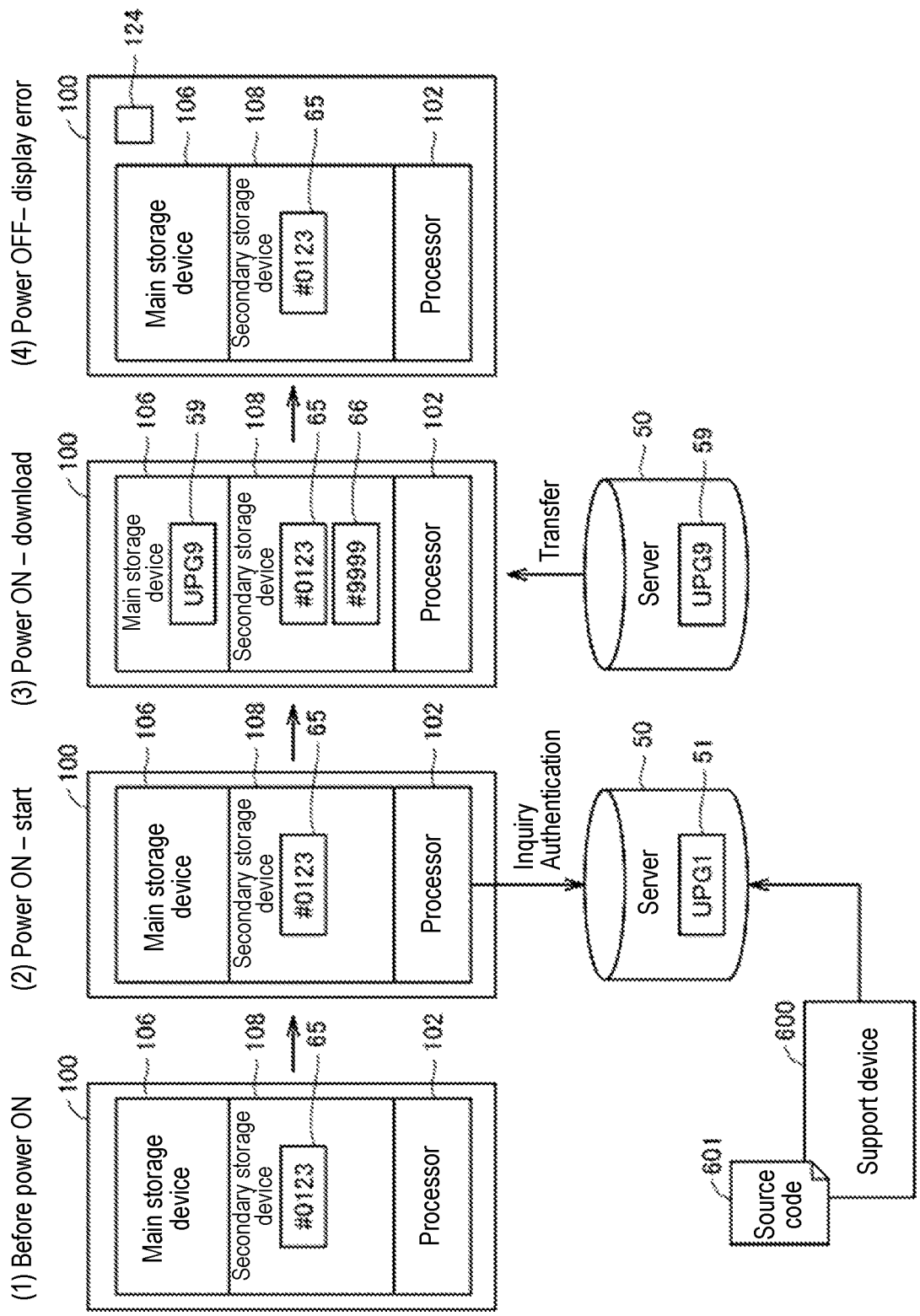
FIG. 12 is a schematic diagram showing a method for detecting tampering of a control program, which may be implemented by the present embodiment.

FIG. 12 is a schematic diagram showing a method for detecting tampering of the control program, which may be implemented by the present embodiment. With reference to FIG. 12, a hash value 65 of the control program 51 executed last time is stored in the secondary storage device 108 of the control unit 100. The hash value 65 may be generated by the program management unit 153 (see FIG. 7). Since the secondary storage device 108 is a non-volatile storage device, the hash value 65 is stored in the control unit 100 even when the power of the control unit 100 is turned off (step (1)).

When the power is turned on, the control unit 100 is started. The control unit 100 executes an inquiry and authentication process to the server 50 (step (2)).

The server 50 stores the control program 51 (denoted as "UPG1" in FIG. 8). However, it is assumed that the control program 51 stored in the server 50 has been tampered with due to an unauthorized access to the server 50 from the outside. In this case, an unauthorized control program 59 is stored in the server 50.

The control unit 100 downloads the control program 59 from the server 50. The processor 102 (the program management unit 153) generates a hash value 66 of the control program 59. The processor 102 (the program management unit 153) collates the hash value 66 with the hash value 65 (step (3)).

In this case, the hash value 66 and the hash value 65 do not match. Therefore, the processor 102 detects the error and notifies the user of the error. The processor 102 may turn on the indicator 124 to notify the error (step (4)). Alternatively, the processor 102 may make the HMI 800 (see FIG. 5) to display an error message. When the hash value 66 and the hash value 65 match, the control program downloaded from the server 50 is the same as the control program executed last time by the control unit 100. Therefore, in this case, the control program downloaded from the server 50 is stored in the main storage device 106.

As described above, according to the present embodiment, by turning on the control unit 100, the control unit 100 downloads the control program from the server. The control program is stored in the main storage device (volatile storage device) of the control unit 100. By turning off the power, the control program 51 is erased from the control unit 100. Therefore, the possibility of leakage from the control unit 100 can be reduced.

<J. Appendix>

As described above, the present embodiment includes the disclosures listed below.

1. A controller system (1), including:
   a program acquisition unit (152) that acquires, by turning on the controller system (1), a control program from a server (50) in which the control program is stored;
   a volatile storage device (106) that stores the control program acquired by the program acquisition unit (152) while electric power is supplied to the controller system (1) and erases the control program by stopping the supply of the electric power to the controller system; and
   a program execution unit (154) that executes the control program stored in the volatile storage device (106).

2. The controller system (1) according to configuration 1, further including:
   a program management unit (153) that manages the validity of the control program by verifying the consistency of information associated with the control program.

3. The controller system (1) according to configuration 2, wherein the program acquisition unit (152) receives the control program and a program ID (55) associated with the control program from the server (50) through encrypted communication with the server (50), and the program management unit (153) verifies the control program and the program ID (55) have not been tampered with and stores the control program in the volatile storage device (106) when verifying a verification ID (1110) previously assigned the control program matches the program ID (55).

4. The controller system (1) according to configuration 3, wherein the program management unit (153) generates a holding variable that is a variable for holding a state of the controller system (1), and uploads the holding variable to the server (50) when the controller system (1) shuts down; and the program acquisition unit (152) acquires the holding variable from the server (50) together with the control program and the program ID.

5. The controller system (1) according to configuration 2, wherein the controller system (1) further includes a non-volatile storage device (108) that non-volatilely stores a hash value (65) generated from the previously executed control program, and the program management unit (153) generates a hash value (66) of the control program acquired by the program acquisition unit (152), and stores the control program in the volatile storage device (106) when the hash value generated by the program management unit (153) matches the hash value stored in the non-volatile storage device.

The embodiments disclosed this time should be considered to be exemplary and not restrictive in all respects. The scope of the invention is shown by the claims rather than the above description, and it is intended to include all modifications within the meaning and scope equivalent to the claims.

What is claimed is:

1. A controller system, comprising:
a processor, configured to acquire, by turning on the controller system, a control program from a server in which the control program is stored;
a volatile storage device that stores the control program acquired while electric power is supplied to the controller system and erases the control program by stopping supply of the electric power to the controller system; and
a non-volatile storage device that non-volatilely stores a first hash value generated from previously executed control program, wherein
the processor is further configured to:
execute the control program stored in the volatile storage device,
generate a holding variable that is a variable for holding a state of the controller system, and upload the holding variable to the server when the controller system shuts down, wherein
when controller system is restarted, the processor acquires the holding variable together with the control program and a program ID associated with the control program from the server through encrypted communication with the server, and
generates a second hash value including the control program, the program ID, and the holding variable, verifies the control program and the program ID have not been tampered with and stores the control program in the volatile storage device when the generated second hash value matches the first hash value stored in the non-volatile storage device.

2. The controller system according to claim 1, wherein the processor is further configured to validity of the control program by verifying consistency of information associated with the control program.

3. The controller system according to claim 2, wherein the processor is further configured to receive the control program and a program ID associated with the control program from the server through encrypted communication with the server, and
verify the control program and the program ID have not been tampered with and stores the control program in the volatile storage device when verifying a verification ID previously assigned to the control program matches the program ID.

* * * * *